(12) United States Patent
Clevorn (10) Patent No.: US 10,397,667 B2
(45) Date of Patent: Aug. 27, 2019

(54) SENSOR POSITION OPTIMIZATION BY ACTIVE FLEXIBLE DEVICE HOUSING

(71) Applicant: Intel IP Corporation, Santa Clara, CA (US)

(72) Inventor: Thorsten Clevorn, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/719,108

(22) Filed: Sep. 28, 2017

(65) Prior Publication Data

US 2019/0098374 A1    Mar. 28, 2019

(51) Int. Cl.
*H04Q 1/02* (2006.01)
*G05B 15/02* (2006.01)
*H04W 52/02* (2009.01)
*H04N 5/232* (2006.01)

(52) U.S. Cl.
CPC ............... *H04Q 1/03* (2013.01); *G05B 15/02* (2013.01); *H04N 5/23219* (2013.01); *H04W 52/0235* (2013.01)

(58) Field of Classification Search
CPC ....... H04Q 1/03; G05B 15/02; H04N 5/23219
See application file for complete search history.

(56) References Cited

U.S. PATENT DOCUMENTS

| | | | |
|---|---|---|---|
| 6,850,773 B1 | 2/2005 | Ghassabian | |
| 7,003,316 B1 | 2/2006 | Elias et al. | |
| 9,030,318 B1 | 5/2015 | Baldwin et al. | |
| 9,432,969 B1 | 8/2016 | Clevorn | |
| 9,966,650 B2 * | 5/2018 | Burdick | H01Q 1/1257 |
| 2003/0050039 A1 | 3/2003 | Baba et al. | |
| 2010/0090926 A1 * | 4/2010 | Li | H01Q 1/242 343/882 |

(Continued)

FOREIGN PATENT DOCUMENTS

| | | |
|---|---|---|
| KR | 10-2014-0099006 A | 8/2014 |
| KR | 10-2015-0010516 A | 1/2015 |

(Continued)

OTHER PUBLICATIONS http://www.digitaltrends.com/mobile/samsung-foldable-smartphone-news/, downloaded Mar. 19, 2018, 12 pages.

(Continued)

*Primary Examiner* — Vincent H Tran
(74) *Attorney, Agent, or Firm* — Grossman, Tucker, Perreault & Pfleger, PLLC (57) ABSTRACT

A mobile communication device consistent with the present disclosure may automatically fold itself in order to reorient an antenna within the device housing. This reorientation may result in changes in antenna power efficiency and/or signal strength. As another example, the same or a similar device may automatically fold itself such that an onboard camera fixed to the device may be dynamically reoriented to, e.g., track a subject, record a panoramic image or video, account for motion of a subject or of the device, etc. The automatic self-folding nature of these or other devices is particularly advantageous in that it does not require manual manipulation by a user. Folding may be performed by inducing a torque about a pivot axis using one or more torque mechanisms (e.g., motors).

25 Claims, 6 Drawing Sheets

(56) References Cited

U.S. PATENT DOCUMENTS

| | | | |
|---|---|---|---|
| 2011/0194713 | A1 | 8/2011 | Apfel et al. |
| 2013/0050021 | A1* | 2/2013 | Wang .................... H01Q 1/2291 |
| | | | 342/359 |
| 2014/0004906 | A1 | 1/2014 | Chi et al. |
| 2014/0139724 | A1* | 5/2014 | Yasuda ............... H04N 5/23212 |
| | | | 348/349 |
| 2014/0146239 | A1* | 5/2014 | Guillen .................. H01Q 1/125 |
| | | | 348/731 |
| 2014/0285375 | A1* | 9/2014 | Crain .................... G01S 13/885 |
| | | | 342/25 A |
| 2015/0126113 | A1 | 5/2015 | Cech et al. |
| 2015/0377681 | A1* | 12/2015 | Kleman .............. G01F 25/0061 |
| | | | 73/290 V |
| 2016/0291190 | A1* | 10/2016 | Huang .................... E21B 47/01 |
| 2016/0359573 | A1* | 12/2016 | Pauly .................... H04B 17/12 |
| 2017/0156119 | A1* | 6/2017 | Neves ................ H04W 52/283 |
| 2017/0169559 | A1* | 6/2017 | Tsai ....................... G06T 7/0004 |
| 2017/0330335 | A1* | 11/2017 | Hayashi .................... G06T 7/74 |
| 2018/0035391 | A1* | 2/2018 | Neves ................ H04W 52/283 |
| 2018/0046187 | A1* | 2/2018 | Martirosyan ........ G05D 1/0094 |
| 2018/0175498 | A1* | 6/2018 | Kurniawan ............ H01Q 3/005 |

FOREIGN PATENT DOCUMENTS

| | | |
|---|---|---|
| KR | 10-2015-0019037 A | 2/2015 |
| KR | 10-2015-0057037 A | 5/2015 |

OTHER PUBLICATIONS

Burlacu, Alexandra: "Samsung Might Be Working on a Foldable Galaxy S7: An Apple iPhone Killer?" Tech Times, http://www.techtimes.com/articles/72119/20150727/samsung-might-be-working-on-afoldable-galaxy-s7-an-apple-iphone-killer.htm, downloaded Mar. 19, 2018, 2 pages.

Office Action issued in U.S. Appl. No. 14/752,899, dated Apr. 12, 2016, 6 pages.

Notice of Allowance issued in U.S. Appl. No. 14/752,899, dated May 11, 2016, 7 pages.

International Preliminary Report on Patentability and Written Opinion issued in PCT Application No. PCT/US2016/034771, dated Jan. 11, 2018, 13 pages.

International Search Report and Written Opinion issued in PCT Application No. PCT/US2016/034771, dated Sep. 29, 2016, 14 pages.

\* cited by examiner

SENSOR POSITION OPTIMIZATION BY ACTIVE FLEXIBLE DEVICE HOUSING

TECHNICAL FIELD

The present disclosure relates to systems and methods for actively repositioning flexible devices to optimize sensor position and/or orientation.

BACKGROUND

Battery life is one of the most significant metrics of mobile device performance, with consumer demands increasing despite newer features consuming even more power than before. While battery technology and capacity have improved as well, larger displays and more demanding applications/hardware threaten to enable power consumption to outpace storage improvements. As such, optimization of existing features to reduce their power overhead is particularly advantageous. These optimizations may take the form of increasing efficiency of hardware components or reducing unnecessary computations in software.

The major power consumption "culprits" in modern devices typically are the display (depending upon brightness settings), the CPU, and the various wireless antennae. While these components have realized substantial efficiency improvements over the years, the antennae in particular have mainly achieved this via efficient power state switching (i.e., turning them off when not in use).

Relatively minor changes in orientation and/or position of an antenna of a mobile communication device can have significant impacts on performance, particularly signal strength and power consumption. As many antennae included in modern mobile devices are polarized "vertically," their performance is usually closer to optimal when a mobile device is "standing up" (e.g., with the antenna perpendicular to ground). As mobile devices are often left face-up or face down on/in desks, tables, etc., wireless communication systems of modern mobile communication devices are often performing under sub-optimal conditions. This can result in surprising losses of efficiency, leading to, e.g., reduced battery life, increased heat emission, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The systems and methods disclosed herein provide device reconfiguration features that facilitate improved sensor functionality and/or efficiency. As a non-limiting example, a mobile communication device consistent with the present disclosure may automatically fold itself in order to reorient an antenna within the device housing. This reorientation may result in changes in antenna power efficiency and/or signal strength. As another example, the same or a similar device may automatically fold itself such that an onboard camera fixed to the device may be dynamically reoriented to, e.g., track a subject, record a panoramic image or video, account for motion of a subject or of the device, etc. The automatic self-folding nature of these or other devices is particularly advantageous in that it does not require manual manipulation by a user. Folding may be performed by inducing a torque about a pivot axis using one or more torque mechanisms (e.g., motors).

Throughout this disclosure, reference may be made to a device "folding" itself. The term "folding" is used merely as an example and is not intended to limit the disclosure; devices according to embodiments of the present disclosure may bend, flex, shift, or otherwise reconfigure themselves. As used herein, the term "rotating" is interchangeable with "folding." Similarly, the terms "orientation" and "configuration" are used interchangeably with each other herein.

Figure 1:
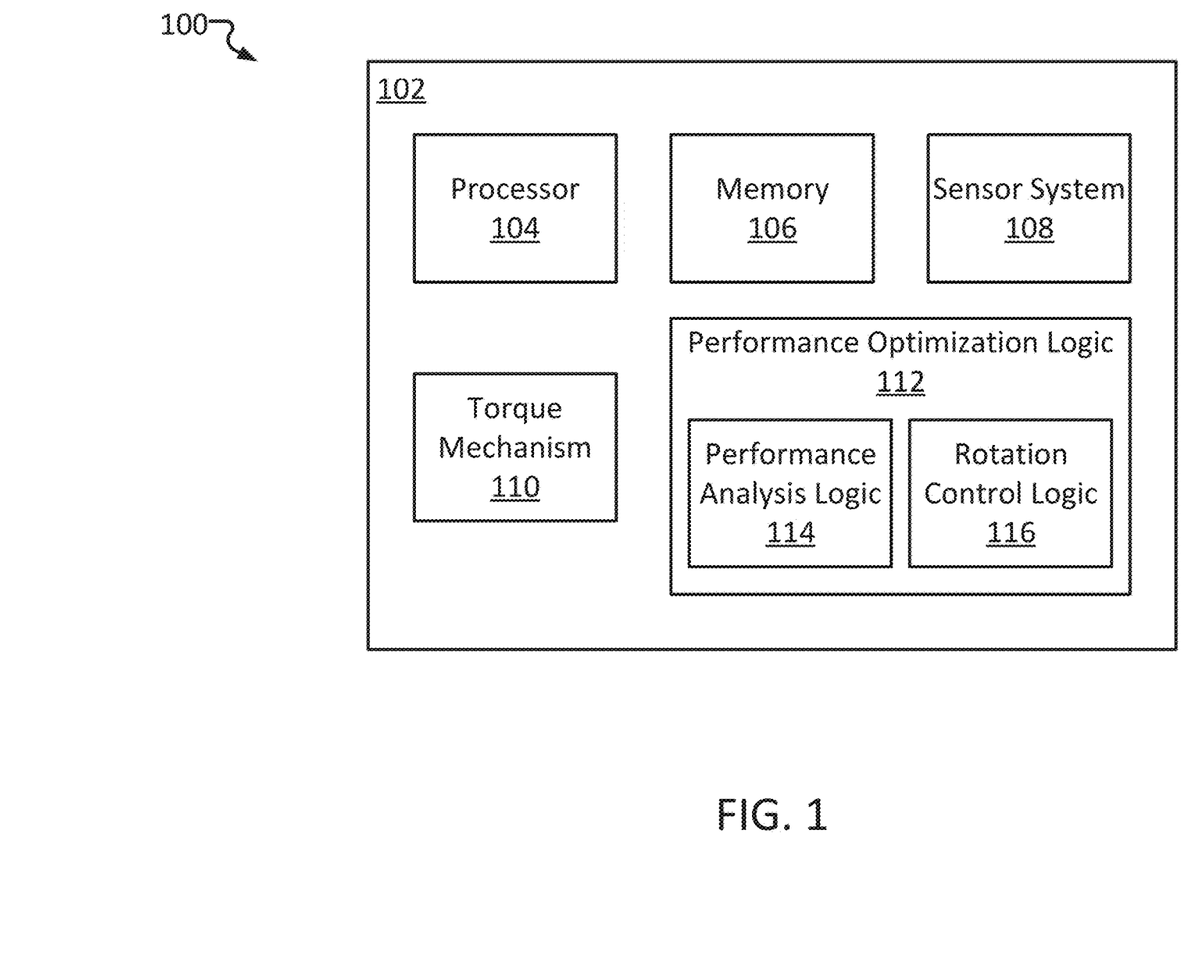
FIG. 1 illustrates a self-folding device according to several embodiments of the present disclosure.

FIG. 1 illustrates a self-folding device 102 according to several embodiments of the present disclosure. The device 102 generally includes a processor 104, memory 106, sensor system 108, and a torque mechanism 110 generally configured to impart torque on part of the device 102. Device 102 further includes performance optimization logic 112 generally configured to optimize, maximize, or otherwise improve performance of sensor system 108. Performance optimization logic 112 includes performance analysis logic 114 generally configured to monitor one or more performance metrics of sensor system 108 and rotation control logic 116 generally configured to control torque mechanism 110.

In general, the device 102 is configured to reconfigure (e.g., rotate, bend, flex, shift, fold etc.) itself in order to improve performance of sensor system 108. In some embodiments, performance optimization logic 112 may monitor performance of sensor system 108 via performance analysis logic 114 and trigger folding of device 102 via rotation control logic 116 based upon the determined performance. Torque mechanism 110 is generally configured to cause device 102 to fold into a new orientation. Upon rotating to a new orientation or configuration, performance optimization logic 112 is generally configured to stop folding of device 102 and reevaluate performance of sensor system 108. Notably, this may be performed automatically, e.g. without intervention, prompting, or other interaction from a user of device 102.

In some embodiments, performance analysis logic 114 may compare performance metrics may to a threshold and cause folding of device 102 to begin or resume if the performance metrics are below the threshold. In the same or other embodiments, performance analysis logic 114 may cause folding of device 102 to cease if the performance metrics meet or exceed the threshold. However, in some embodiments, performance optimization logic 112 may cause device 102 to rotate through several orientations, evaluating each untried orientation, before selecting the orientation with the best performance for sensor system 108. In these and other embodiments, rotation control logic 116 may cause torque mechanism 110 to fold device 102 to a new orientation even if performance analysis logic 114 determines that performance metrics of sensor system 108 exceed the threshold. In some embodiments, the threshold may be a previous value of the performance metrics of system 108.

Performance metrics to be monitored or determined by performance analysis logic 114 may vary depending upon the nature of sensor system 108. For example, if sensor system 108 comprises a wireless communication antenna, performance metrics may include signal strength, throughput, dropped packet rate, etc. In embodiments wherein sensor system 108 comprises a camera, performance metrics may include image quality, focus, etc., determined via image analysis performed by, e.g., performance analysis logic 114. Performance metrics may also include tracking metrics. For example, if device 102 is set to record video, performance analysis logic 114 may be configured to perform tracking techniques (e.g., skeleton tracking, blob analysis, template matching techniques, Viola-Jones algorithm, etc.), and may send a folding trigger to rotation control logic 116 in response to results of the tracking. For example, if a tracked person is determined to be near an edge of a frame of a video recorded by a camera of sensor system 108, performance analysis logic 114 may trigger rotation control logic 116 to cause torque mechanism 110 to fold device 102 to reorient the camera such that the tracked person remains within a field of view of the camera.

Rotation control logic 116 is generally configured to control torque mechanism 110. For example, rotation control logic 116 may send electrical signals to cause torque mechanism 110 to exert a torque about a certain axis of rotation. Rotation control logic 116 may receive a folding trigger from performance analysis logic 114, and may control torque mechanism 110 in response to the trigger. Performance analysis logic 114 may send the trigger to rotation control logic 116 in response to determining that performance metrics of sensor system 108 are below a threshold. However, as described above, in some embodiments device 102 may try several or all of a set of orientations before deciding upon the orientation with the best performance of sensor system 108. In these embodiments, rotation control logic 116 may cause folding of device 102 even if the performance metrics are satisfactory (e.g., meet or exceed the threshold). For example, performance analysis logic 114 may monitor a list of possible orientations to test, and if not all orientations on the list have been tested, performance analysis logic 114 may store a current value of performance of sensor system 108 but still send a rotation trigger to rotation control logic 116. In other embodiments, the list comparison may be performed by rotation control logic 116, so rotation control logic 116 may be configured to cause folding despite not receiving a trigger from performance analysis logic 116.

In some embodiments, torque mechanism 110 may include multiple mechanisms (e.g., electric motors) configured to exert torque about one or more axes of rotation. In these or other embodiments, rotation control logic 116 may determine which torque mechanisms to control, by how much, about which axis, etc. in order to reorient the sensor system 108 in the appropriate direction. To aid in this determination, rotation control logic 116 may utilize information about the current orientation of device 102. This information may be stored in memory 106 or determined via one or more sensors (e.g., accelerometers, gyroscopes, etc., which may or may not be included in sensor system 108). Rotation control logic 116 may also utilize information about sensor system 108, including positions, orientations, polarizations (if the monitored sensors include an antenna) of the sensors. Sensor system 108 information may be stored in, for example, memory 106. As device 102 is folded, sensor system 108 information may be updated based upon the rotations performed via torque mechanism 110. In some embodiments, memory 106 stores basic information about sensor system 108, including type of sensor(s), position and orientation relative to device 102 (e.g., on an XYZ coordinate system with an origin at the center of device 102). During operation, rotation control logic 116 may be configured to determine position or orientation of sensor system 108 relative to an environment that device 102 is in (e.g., a room).

As an example, in one embodiment device 102 is a smartphone at rest flat on a desk and sensor system 108 is a WiFi antenna with known position, orientation, and polarization relative to device 102, rotation control logic 116 may be configured to determine orientation of the antenna relative to the environment based on gravity (e.g., read from accelerometer data). Thus, rotation control system 116 may be able to determine that the WiFi antenna is oriented sub-optimally (if the accelerometer data indicates that the device is at rest flat while the antenna is known to be polarized/oriented such that lying flat results in poor performance). If device 102 undergoes folding, rotation control logic 116 may be configured to predict the resulting new orientation of the antenna.

Figure 2:
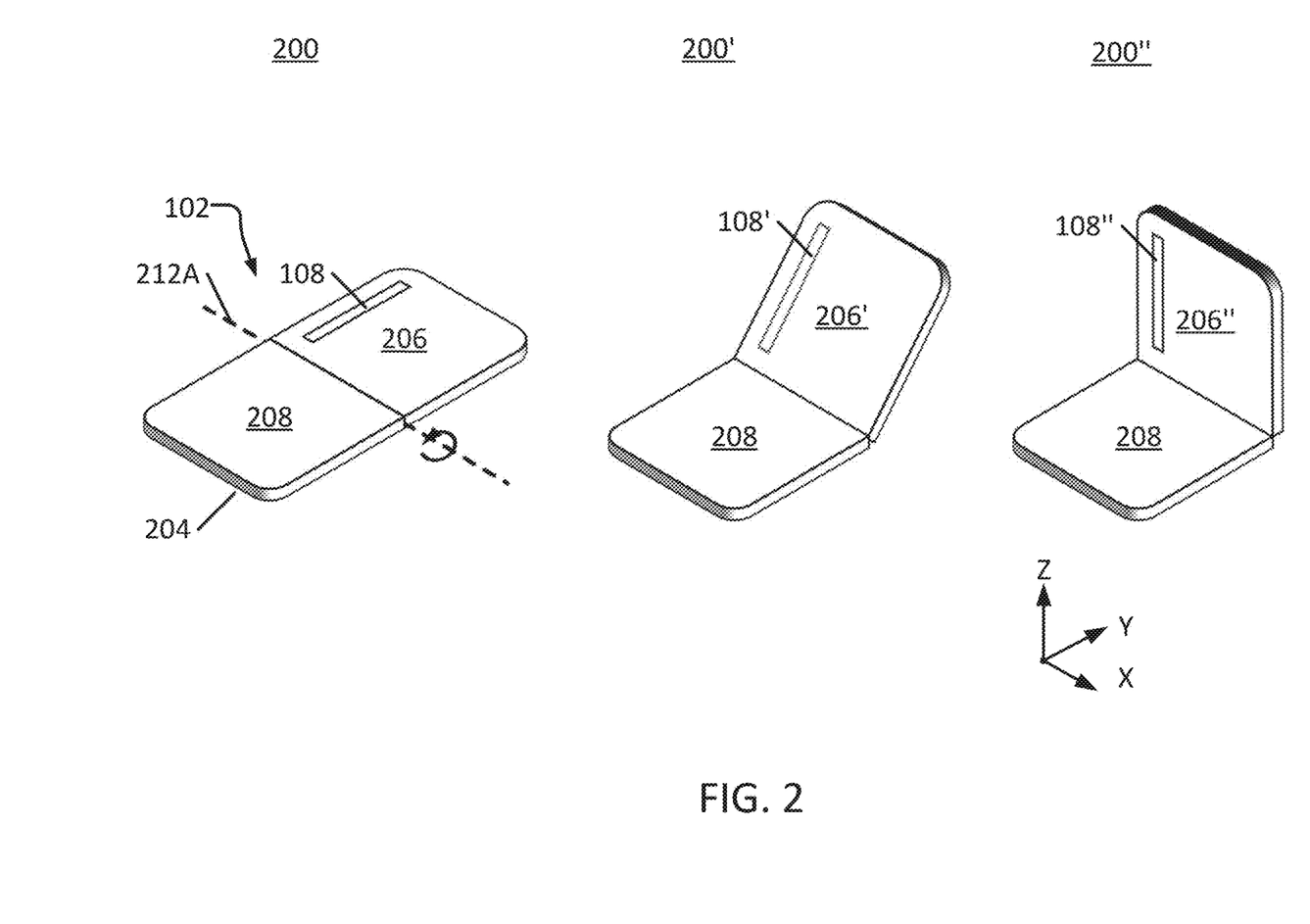
FIG. 2 illustrates three-dimensional views of an example device at different stages of folding according to several embodiments of the present disclosure.

FIG. 2 illustrates three-dimensional views of an example device 102 at different stages of folding 200, 200', 200" according to several embodiments of the present disclosure. Device 102 includes at least a housing 204, the housing having at least two portions 206 and 208. As described above, device further includes a sensor system 108 and at least one torque mechanism (not visible in FIG. 2) to rotate at least one component of the device (e.g., 206) about a rotation axis, such as 212A.

Device 102 is generally configured to rotate through various orientations (such as, for example, 100, 100', 100", etc.) in order to improve performance of sensor 108. Typically, device 102 rotates automatically, e.g. in response to a trigger. Rotation may be triggered in a variety of ways. For example, as described above, performance analysis logic 114 may trigger rotation in response to determining that a performance metric of sensor system 108 is unsatisfactory (e.g., below a threshold). In some embodiments, performance analysis logic 114 sends information based on its performance analysis to performance optimization logic 112, while performance optimization logic 112 is configured to send a trigger to rotation control logic 116. In some embodiments, device 102 may rotate through orientations periodically (e.g., every 30 minutes). In some embodiments, rotation may be prompted by, e.g., a user (not shown in FIG. 2).

Figure 3A:
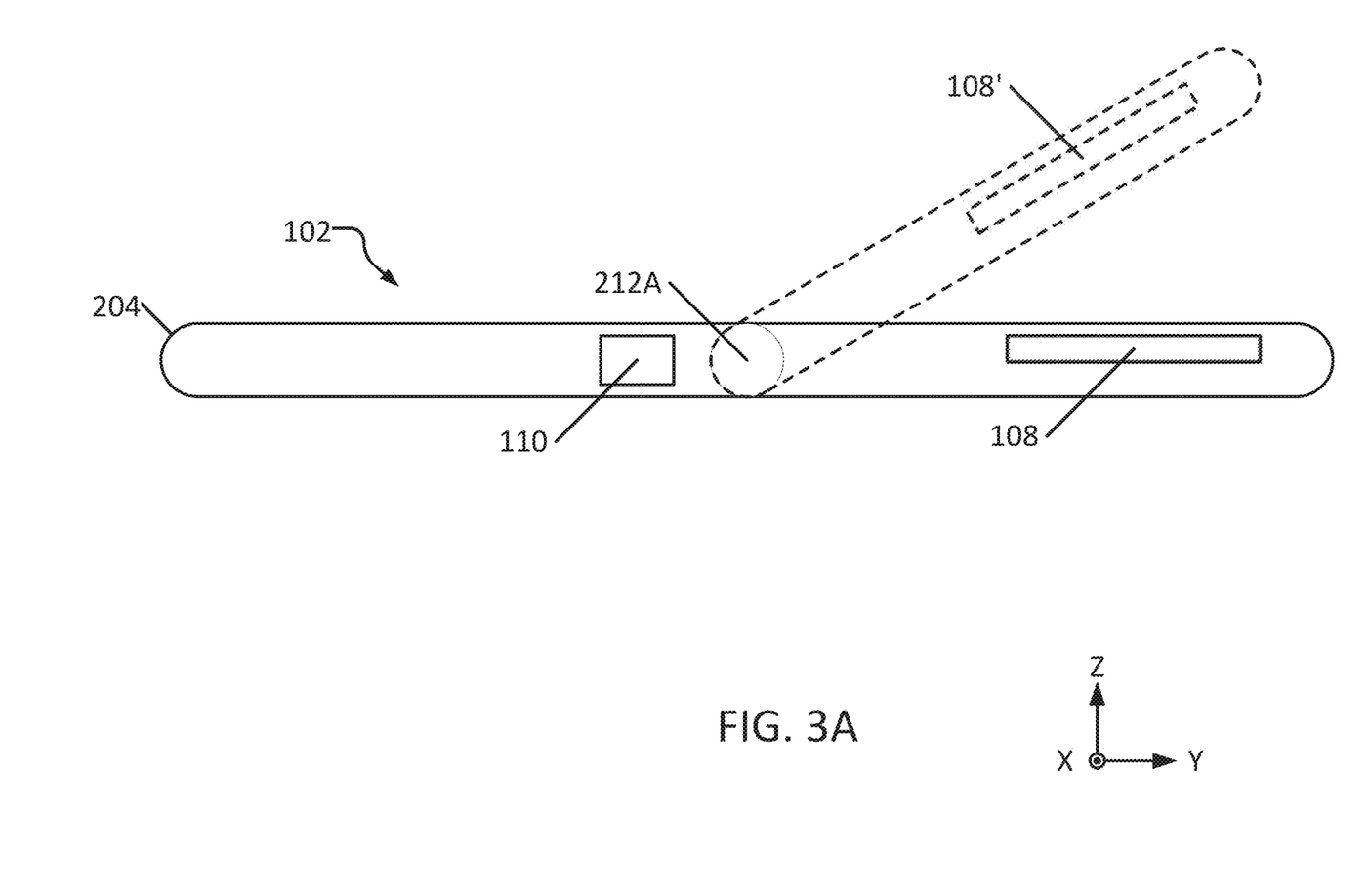
FIG. 3A illustrates a cross-sectional view of an example device according to one embodiment of the present disclosure.

FIG. 3A illustrates a cross-sectional view of an example device 102 according to one embodiment of the present disclosure. As shown in FIG. 3A, device 102 may fold about an axis 212A. As described above, rotation control logic 116 may cause or control torque mechanism 110 to exert a torque on at least part of device 102 to cause folding about the axis. Housing 204 is generally constructed to enable folding about at least one axis (e.g., 212A). For example, housing 204 may include one or more hinges or joints. The hinges may be traditional hinges, rubber-like flexible connections, materials that change shape when heated (e.g., by an electric current), known as "shape-memory alloys," etc.

Figure 3B:
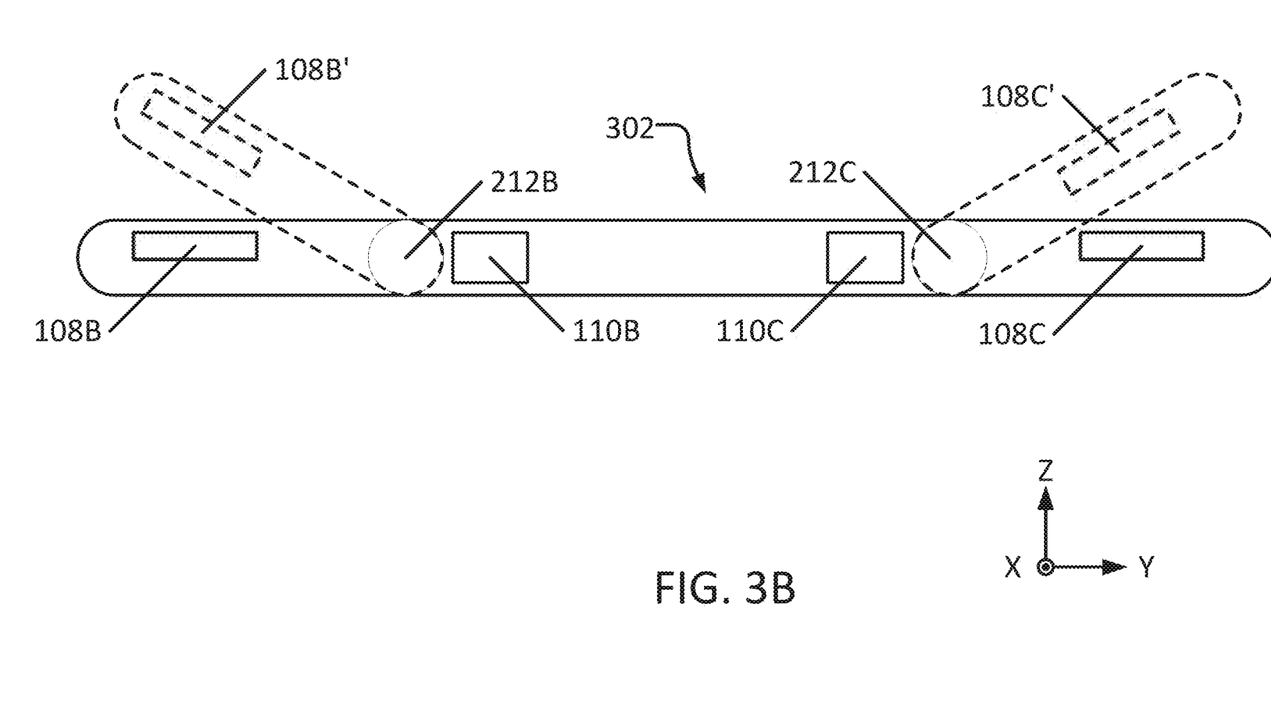
FIG. 3B illustrates a cross-sectional view of an example device according to one embodiment of the present disclosure.

FIG. 3B illustrates a cross-sectional view of another example device 302 according to one embodiment of the present disclosure. Example device 302 comprises multiple axes of rotation 212B and 212C. Multiple torque mechanisms 110B and 110C are configured to exert torque about 212B and 212C, respectively. In this and other embodiments, rotation control logic 116 controls both/all torque mechanisms. Device 302 includes multiple sensor systems 108B and 108C at different locations of the device. Performance optimization logic 112 may be configured to compare performance improvements achieved from various orientations to determine a best orientation that results in minimized energy consumption. For example, in some embodiments, performance optimization logic 112 may be configured to determine a best orientation based on changes in total energy usage (rather than efficiency or throughput). In some embodiments, the best orientation may actually cause a performance decrease/energy consumption increase in some sensor systems, if the same orientation results in an energy savings in a different sensor system that makes up the difference.

As an example, in one embodiment device 302 is a tablet computer, sensor system 108B includes a WiFi antenna, and sensor system 108C includes a GPS receiver. In a first orientation, the WiFi antenna may require, e.g., 10 W, while the GPS receiver requires 3 W. In a second orientation that places the WiFi antenna in a more optimal orientation, the WiFi antenna may only require, e.g., 4 W, but the GPS receiver may be placed in a worse orientation, causing it to require 5 W. Even if a third configuration may cause marginal improvements in power consumption of both sensors (e.g., 8 W WiFi and 3 W GPS), the second configuration may still be the best orientation—the first orientation results in a combined power consumption of 13 W, the second results in 9 W, while the third results in 11 W. Thus, even though performance metrics of one sensor system may suffer, overall power consumption (and therefore battery life) may be improved.

In some embodiments (e.g., wherein one sensor system is a camera and performance optimization logic 112 is configured to maintain tracking of a target), performance of one sensor (e.g., the camera) may take priority over others, even at the cost of battery life/energy. Thus, even if the folding required to keep the target in view of the camera would cause an unrelated sensor to double its power consumption, it may still be selected as the "best" orientation. However, performance optimization logic 112 may still account for power consumption of other sensors; e.g., if multiple orientations would result in satisfactory tracking results, performance optimization logic 112 may be configured to select the orientation among those that minimizes power consumption of other sensors. Other considerations for best orientation may include anticipated folding time, balance considerations (if the orientation might result in the device 302 falling over, which may be determined via accelerometer/gyroscope data, known characteristics of device 302 such as distribution/center of mass, moments of inertia, etc.), or anticipated energy consumption of the fold operations. For example, if each attempted orientation had substantially similar performance (e.g., within 3% of the median), and the orientation with the highest performance metric would require more energy than would be saved by the performance increase, performance optimization logic 112 may select a different orientation (possibly including the current orientation). This may even include the orientation with the lowest performance. As a clarifying example, if performance at each orientation is exceedingly similar or within likely variance amounts (e.g., all orientations are within 0.03 W of each other, and each orientation may vary over time within ±0.1 W) then folding to any orientation is likely to waste energy, so performance optimization logic 112 may simply select the current orientation, even if it technically has the "worst" performance.

Once triggered, device 102 may rotate (e.g., via rotation control logic 116 controlling torque mechanism 110) until a predetermined orientation is achieved. For example, rotation control logic 116 may fold device 102 from orientation 200 to orientation 200', wherein at orientation 200' housing portion 206' is at a 45° angle to its previous position at orientation 200. Rotation control logic 116 may control torque control mechanism 110 to fold device 102 until it is at orientation 200'. Orientation of device 102 may be monitored through a variety of means. For example, rotation control logic 116 may receive data from at least one sensor (e.g., an accelerometer, gyroscope, etc.) to determine orientation of portions of device 102. In some embodiments, rotation control logic 116 may determine a particular amount of torque to be exerted by torque mechanism 110 in order to result in the desired orientation, e.g., 0.1 N*m for 3 seconds. Once rotation control logic 116 determines that the desired orientation has been achieved, the rotation control logic may halt rotation. In some embodiments, rotation control logic 116 may cause device 102 to fold through several orientations (e.g., 200, 200', 200", etc.). In these embodiments, when reaching an "intermediate" orientation (e.g., 200'), rotation control logic 116 may pause rotation. Rotation control logic may pause rotation for a preset period of time (e.g., 5 seconds), or until another folding trigger is received (from, e.g., performance analysis logic 114), at which point rotation control logic 116 causes torque mechanism 110 to fold device 102 to another orientation. In some embodiments, if performance is determined to be satisfactory, then rotation control logic 116 may cease rotation before trying all orientations. In some embodiments, a list of various orientations to test may be predetermined and stored in, e.g., memory 106. In some embodiments, rotation control logic 116 is configured to determine orientations to try based on, for example, the relative position and orientation of sensor system 108.

Rotation may cease in response to a trigger as well. For example, rotation control logic 116 may stop rotation if device 102 is interacted with (by, e.g., a user). As the operations of performance optimization logic 112 and torque mechanism 110 do consume energy/power, the power savings of folding device 102 into a more optimal configuration may not be realized unless the device is to remain in the optimal configuration for some time (e.g., 5 minutes, 30 minutes, etc.)

For example, if device 102 is a smartphone that spends a relatively small portion of energy (e.g., 60 J) to determine and fold into an orientation that reduces power consumption of sensor system 108 by 1 W, this optimization would result in a net cost of energy for the first 60 seconds. Were device 102 to remain in this orientation for longer than 1 minute, then the operations would result in reduced overall energy consumption and therefore longer battery life. However, if, for example, a user was to interact with device 102 (e.g., pick up, move, etc.), device 102 is likely to be repositioned within its environment, which may cause the determined orientation to become sub-optimal. In this example, if this occurs within 1 minute, the operations would have resulted in a net consumption of energy. Further, depending upon the orientation and the desired interaction from the user, device 102 may need to be folded back into a different configuration (e.g., flat orientation 200) before the user can complete the interaction. For example, if device 102 is optimized by folding into a right angle, such as orientation 200", and a user wishes to watch a video on a display of device 102, the device likely must be folded back to a flat to enable the user to view the display/video properly. In some embodiments, rotation control logic 116 may be configured to fold device 102 back automatically, which also consumes power, further reducing battery life. In some embodiments, torque mechanism 110 may be configured to allow an external force (e.g., force applied by a user) to fold device 102, which may save energy otherwise used to fold back. In some embodiments, torque mechanism 110 may be configured to function as a generator when device 102 is folded manually, adding energy back into the battery.

In some embodiments, automated folding back may be triggered by an event occurring in device 102. For example, an alarm clock function of device 102 may cause rotation control logic 116 to fold device 102 back into a "normal" orientation (e.g., 200). The normal configuration may be set by a user, but in some embodiments may have a default setting. Other fold back triggers may include device 102 receiving an incoming call or message (though if device 102 is in a "do-not-disturb" mode, rotation control logic 116 may not receive the trigger or may ignore it), a preset time (e.g., rotation control logic 116 may cause device 102 to fold back at 9:00 AM, regardless of user-set alarms), an "idle" state coming to an end, etc.

Thus, the optimization operations typically result in better energy savings when performed just prior to device 102 remaining idle for an extended period of time (e.g., idling flat on a desk overnight). Similarly, if device 102 undergoes an extended optimization operation (e.g., cycling through a long list of possible orientations before determining and selecting a best option) and a user interacts with device 102 immediately after folding to the best option completes, a substantial energy loss may be incurred. Therefore, in some embodiments, rotation control logic 116 may be configured to ignore or refuse rotation triggers for a given period of time (e.g., 5 minutes, 30 minutes, etc.) after a last interaction (e.g., from a user) is detected. This may advantageously prevent performance optimization logic 112 from consuming energy during high-use periods where folding is less likely to result in energy savings. In some embodiments, performance analysis logic 114 is put into an idle, low-power, or disabled state for similar periods of time. Performance optimization logic 112 may wake up/reactivate performance analysis logic 114 and/or rotation control logic 116 once the time is elapsed. Other wake up triggers may include device 102 entering an "idle" state, time of day (e.g., at night), device 102 entering a "do-not-disturb" mode, a lack of calendar entries on device 102, etc.

In some embodiments, rotation control logic 116 may evaluate folding to determine if an error has occurred (e.g., if device 102 has not been folded as intended). This may occur, for example, as a result of a failed component (e.g., torque mechanism 110 is non-functional or non-responsive), environmental conditions (e.g., device 102 is pinned underneath a heavy object, preventing folding), etc. In these and other situations, if an error has occurred, rotation control logic 116 may be configured to stop attempting to fold device 102. In some embodiments, rotation control logic 116 is further configured to either ignore further rotation triggers or to respond to them with an error message. In some embodiments, if a folding error is detected, rotation control logic 116 may send an error message to performance optimization logic 112, which may in turn cause device 102 to indicate an error (e.g., display an error message on a display to a user, transmit an error message via communications circuitry to a remote device, emit an audible cue, etc.).

Rotation control logic 116 may determine if a folding error has occurred using sensor data (e.g., data from sensor system 108, accelerometer data, gyroscope data, etc.). In some embodiments, rotation control logic 116 may analyze accelerometer data from before a fold operation to determine predicted accelerometer data from the same accelerometer(s) during or after the fold operation is performed. For example, referring to FIG. 2, if device 102 in configuration 200 is at rest flat on a surface, an accelerometer in portion 206 may indicate acceleration due to gravity perpendicular to the face of portion 206. If device 102 is folded into orientation 200", the same accelerometer would have rotated as well, and thus could be expected to indicate acceleration due to gravity in a direction coplanar with the face of portion 206. Therefore, in this example, after folding from 200 to 200" is attempted, if the accelerometer data still indicates that acceleration due to gravity is perpendicular to the face of portion 206, then folding may have failed. Similar verification may be performed using gyroscopes to verify that rotation is occurring, etc. Note that to enable these and other forms of verification, in some embodiments positions and orientations of sensors such as accelerometers or gyroscopes, etc., may be known to performance optimization logic 112. In some embodiments, rotation control logic 116 may be configured to receive data from one or more sensors of torque mechanism 110 to determine folding success or failure.

The torque mechanism(s) 110 may include, for example, electric motors, piezoelectric motors, or any of a plurality of other torque mechanisms. Example systems described herein will refer to the one or more torque mechanisms as a single motor (per rotational axis), but this is meant merely as a simplifying example and is not intended to limit this disclosure. The housing 204 of the folding device may be partially or entirely composed of flexible materials so as to enable folding about one or more pivot axes, such as axis 212A.

Figure 4:
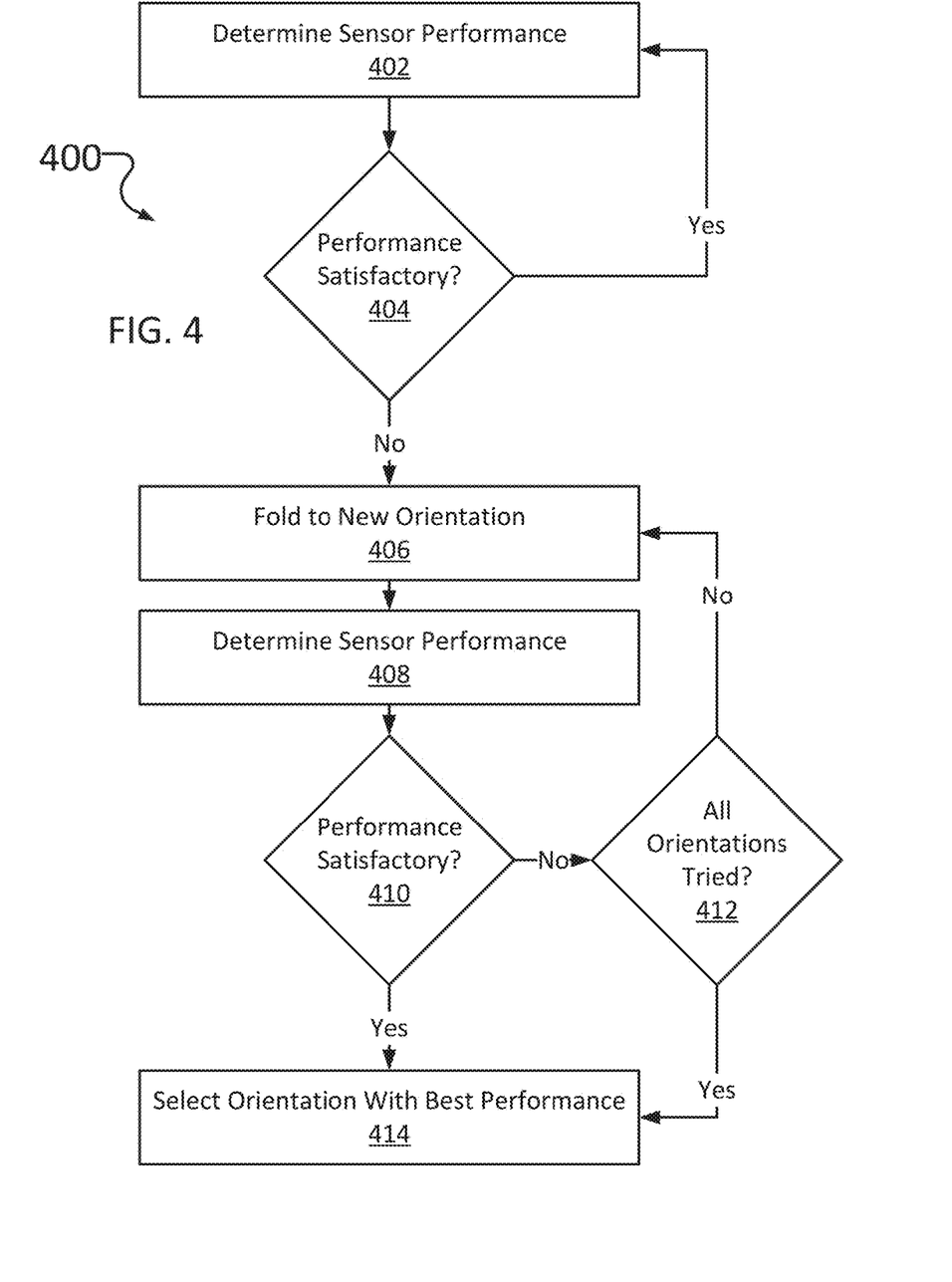
FIG. 4 illustrates operations according to one embodiment of the present disclosure.

FIG. 4 illustrates operations 400 according to one embodiment of the present disclosure. Operations according to this embodiment include determining sensor performance 402. This may be performed by, e.g., performance analysis logic 114, and may include determining one or more performance metrics of sensor system 108. Operations further include determining whether the determined performance is satisfactory. As used herein, performance may be determined to be "satisfactory," for example, if one or more performance metrics are determined to be greater than a threshold value. For example, if a performance metric is signal strength (measured in, e.g., decibel-meters (dBm), a threshold for performance being satisfactory may be −80 dBm. Of course, in some embodiments performance may be satisfactory if a performance metric is below a threshold instead; e.g., if the threshold is a number of dropped packets, satisfactory performance of sensor system 108 would correspond to determining that sensor system 108 has dropped fewer packets than the threshold.

If performance is determined to be satisfactory (e.g., 404 "Yes"), then folding may be unnecessary, so operations may further include returning to monitor/determine sensor performance 402. If performance is determined to be unsatisfactory (e.g., 404 "No"), then folding operations are triggered 406. Once device 102 has folded to a new orientation, operations further include determining sensor performance again 408. This may include the same or similar metric/threshold comparisons that are performed at 402 as described above. Operations may also include determining whether sensor performance is satisfactory 410. Performance may be "satisfactory," as described above, if one or more sensor performance metrics are above associated thresholds. In some embodiments, the thresholds used in 404 and 410 have the same values. In other embodiments, thresholds used in performance comparison 410 may be different (e.g., higher) than those used in comparison 404, as will be described in further detail below.

If sensor performance is not satisfactory (410 "No"), operations may further include determining whether all orientations of an orientation set have been evaluated 412. For example, as described above, rotation control logic 116 may determine a set or list including a plurality of orientations to fold into for sensor performance optimization. If some of the list of orientations have not been tried yet (e.g., 412 "No"), operations further include selecting an untried ("new") orientation and folding to it 406. If all of the list of orientations have been tried (412 "Yes"), operations further include selecting the orientation with the best performance and folding to it 414. If, at 410, sensor performance is determined to be satisfactory (e.g., 410 "Yes"), operations include selecting the orientation with the best performance 414 (causing device 102 to remain at the current satisfactory orientation).

In some embodiments, an orientation table may be stored in, e.g., memory 106. The table may include entries identifying orientations (by, e.g., a position of torque control mechanism 110, relative direction of gravity as determined by an accelerometer, etc.) and performance characteristics. The performance characteristics may include performance of the sensor system 108, a list of orientations expected to have similar performance (e.g., within 5%), and/or a list of orientations expected to have substantially performance (e.g., outside of 5%). The table may identify one or more orientation classes with substantial difference in performance, each orientation classes including multiple similar orientations. For example, referring again to FIGS. 2, 200 and 200" may represent different orientation classes, while minor adjustments (e.g., within 3° about 212A) to 200 may represent similar orientations within class 200. The table may be updated by performance analysis logic 114 as various orientations are attempted and tested.

Depending upon environmental conditions, one orientation (e.g., 200) may result in improved or decreased performance of sensor system 108 relative to another (e.g., 200"). Under some conditions, 200 will result in improved performance relative to 200". Under other conditions, 200" will result in improved performance relative to 200. However, while the superior orientation may change and may not be predictable, there will generally be a substantial difference (e.g., performance at one orientation is not within 5% of performance at the second) between the two, outside of extreme operating conditions (e.g., if sensor system 108 is an electronic transceiver and device 102 is placed within a faraday cage, all orientations are likely to result in similarly poor performance, so 200 and 200" will no longer have a substantial difference). Whether the difference will be an improvement or a detriment may depend upon environmental conditions. For example, consider an embodiment wherein 200 and 200" result in generally opposed performance; if 200 is good, 200" is bad. These relationships are relative; under most environmental conditions, one will be superior (though the superior orientation may change). As the relationships are relative, measured performance at one orientation does not always identify which of the two is superior. If one orientation results in poor performance, the other may result in either good performance or even worse performance.

Similarly, if two orientations result in similar (e.g., within 5%) performance, even though the superior orientation will change (e.g., with environmental conditions), the two orientations may generally perform similarly. Thus, based on relationships between orientations as described in the table, rotation control logic 116 may determine an order in which to rotate through orientations. For example, if the performance of sensor system 108 is far from a satisfactory level, rotating to a similar orientation is not likely to solve the problem. Rotating to a substantially different orientation may make performance significantly worse, but it also may result in significant improvement, possibly boosting sensor performance above a satisfactory threshold. Therefore, depending upon a difference between current sensor performance and desired sensor performance, performance analysis logic 114 may determine whether a significant rotation or a minor rotation is more likely to result in satisfactory performance. In some embodiments, rotation control logic 116 may perform a hierarchical search, making significant rotations first to identify which orientation class results in the best performance, and then performing minor rotations to identify which of the similar orientations of the class results in the best performance, analogous to "coarse" and "fine" adjustments.

Figure 5:
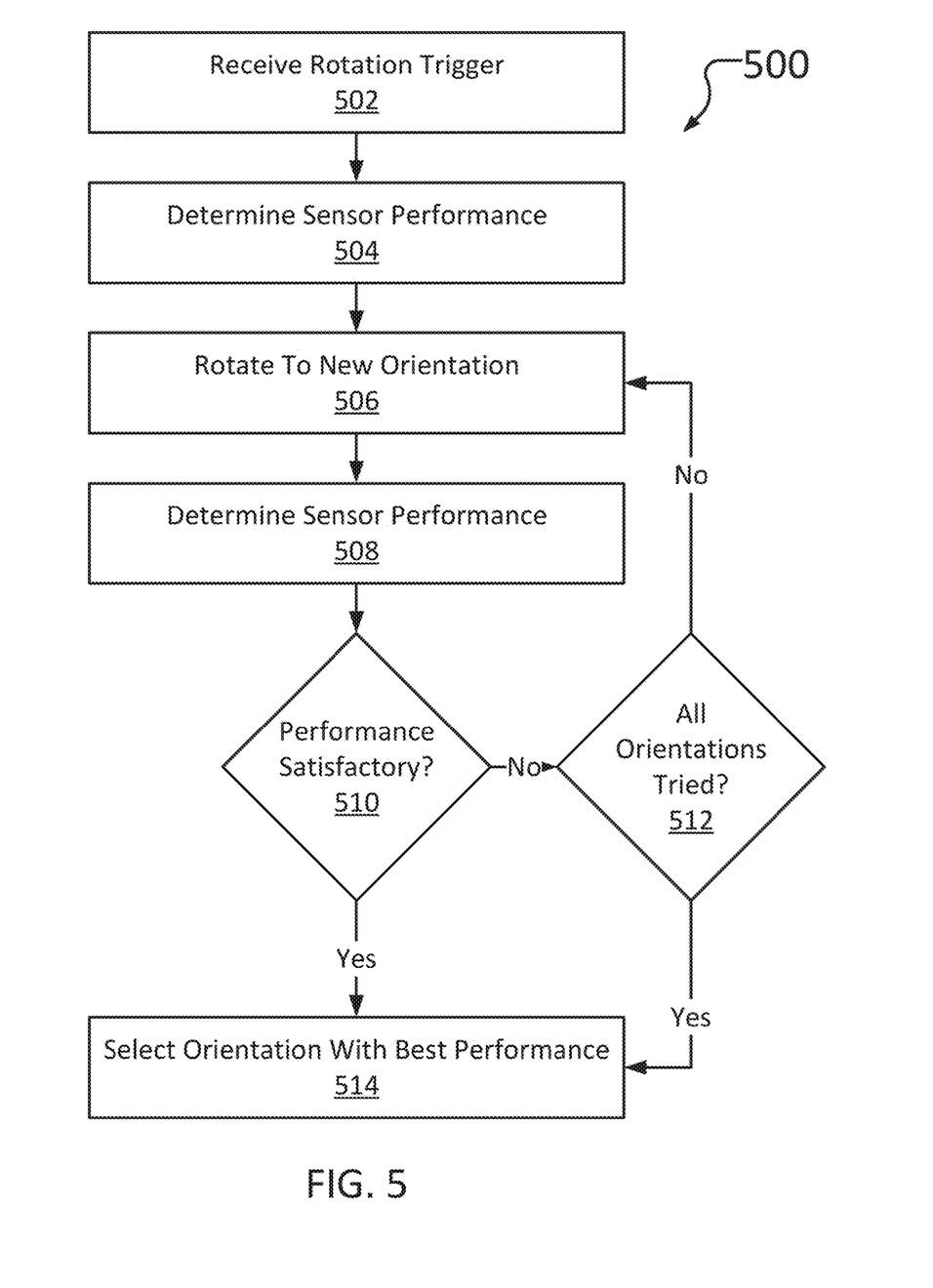
FIG. 5 illustrates operations according to one embodiment of the present disclosure.

FIG. 5 illustrates operations 500 according to one embodiment of the present disclosure. Operations may include receiving a rotation trigger 502. This trigger may be received from, e.g., a user, an application executing on device 102, etc. Operations may further include determining sensor performance 504. This may be determined in a manner similar to 402 in reference to FIG. 4, as described above (e.g., measuring output of sensor system 108 to determine one or more performance metrics). 504 may also include a wait period (e.g., measure output of sensor system 108 over a period of 30 seconds, 5 minutes, etc.). Operations may additionally include rotating to a new orientation 506. This may include, for example, controlling (via, e.g., rotation control logic 116) one or more torque mechanisms to cause device 102 to fold into a new orientation. Operations may also include determining sensor performance at the new orientation 508. This may be performed in a manner similar to 504. Operations may also include determining whether sensor performance is satisfactory 510. "Satisfactory" may imply that one or more performance metrics (e.g., signal strength) is above a threshold. If performance is not satisfactory (e.g., 510 "No"), operations may further include determining whether all of a set of orientations has been attempted 512. If all orientations have been attempted (512 "Yes"), operations may also include selecting the operation with the best performance and folding to it 514. As described above, "best" may not necessarily correspond to the orientation with the maximum performance metric; other factors including variations in performance metric over time and between orientations, expected power consumption required to fold, etc. may be considered. If not all orientations have been tried (512 "No"), operations may include rotating to a new orientation 506. If, at 510, performance is satisfactory (510 "Yes"), then considerations of untried orientations 512 may be skipped and operations may include selecting the orientation with the best performance 514. If 514 is performed as a result of 510 "Yes," the best orientation is likely to be the current orientation (as it will generally be the first orientation to meet the threshold).

As described above, systems and methods described herein may include multiple thresholds (or multiple sets of thresholds) having different values for initiating folding (e.g., comparison 404) and for continuing folding (e.g., comparison 410). For example, if a first threshold for satisfactory performance is −90 dBm, a second threshold may be −80 dBm. This may be advantageous because sensor performance may vary over time; in embodiments wherein the thresholds are identical, if sensor performance at an initial orientation is near (but still below) the threshold, folding to a new orientation may result in exceeding the threshold with only a marginal performance improvement (e.g., <1%). If folding operations are ended at the marginal improvement orientation, then as sensor performance varies, folding may be triggered again (and may even revert back to the initial orientation). Back-and-forth folding over marginal improvements in orientation may waste more energy than it saves. Thus, if folding is triggered (e.g., 404 "Yes"), it may be advantageous to "commit" to cycling through multiple orientations to find the best improvement unless a significantly superior orientation is found (e.g., higher threshold is met, 410 "Yes"). However, if all available orientations fail to boost sensor performance above the second threshold, committing to cycling through multiple orientations may result in wasted power. Thus, in some embodiments, performance optimization logic 112 may provide a user interface to enable a user to control number/values of thresholds. In some embodiments, the second threshold may be an independently set value (e.g., for signal strength, −70 dBm). In other embodiments, the second threshold may simply be a multiplier of the first threshold (e.g., 1.2× for a 20% higher threshold).

It is possible for device 102 to be initially configured in the best orientation already. In such a scenario, were sensor performance to be below a threshold, any resulting folding operations may waste energy with little gain. Depending upon a number of possible orientations, this scenario may be unlikely enough to be inconsequential. However, in some embodiments, as device 102 folds through multiple orientations, performance analysis logic 114 may determine, update, or monitor an overall performance metric. In essence, performance analysis logic 114 may determine, based on the overall performance metric, whether additional folding is likely to be beneficial. For example, the overall performance metric may indicate the relative performance change (flat or percentage change) for every orientation attempted so far. If attempted orientations have consistently (e.g., always, for >95% of orientations, for >90% of orientations, etc.) resulted in performance losses, performance analysis logic 114 may transmit a signal to rotation control logic 116 to interrupt folding operations and/or select the best orientation observed so far (possibly including the initial orientation) and fold to it. As this may result in leaving some planned orientations untested and thus possibly missing out on a substantial performance improvement, performance analysis logic 114 may determine whether folding should be interrupted based further on predicted energy consumption to fold back to the best orientation, as well as the range of performance at various orientations. For example, if device 102 has rotated through 14 out of 15 planned orientations, each attempted orientation has had performance within, e.g., 3% of the median, and the remaining untried orientation would require a significant fold (e.g., 200 to 200″) to test, performance analysis logic 114 may select a best orientation without attempting the untried orientation.

As described above, "best" may depend on multiple factors, including number of sensors, power consumption required for folding, etc. A determination to refrain from attempted an untried orientation may also depend upon the orientation itself. As described above, minor rotations are generally less likely to result in significant change than more significant rotations. Thus, if an entire class of orientations is untested, performance analysis logic 114 may still fold to at least one orientation of the class before terminating folding operations. As some sensors (e.g., antennae) are polarized, if, for example, all of the attempted orientations were on or near the same plane in 3D-space but the remaining orientation(s) would place sensor system 108 in an orthogonal plane, the untested orientations may result in substantial changes. Thus, even if the overall performance metric suggests that performance is consistently similar, performance analysis logic 114 may still continue testing new orientations.

In some embodiments, folding may be performed within device 102, i.e. without changing shape of the device itself. For example, sensor system 108 may be mechanically coupled to a component (e.g., a swiveling mount, a portion of a particle circuit board (PCB) comprising a material that changes shape when supplied with an electric current, etc.) contained within housing 204 of device 102. Torque mechanism 110 may be configured to rotate the component within the housing 204, causing rotation of sensor system 108 without rotating or folding device 102. This way, performance optimization logic 112, performance analysis logic 114 and rotation control logic 116 may determine and improve performance of various orientations of sensor system 108 without folding device 102. While these sensor rotations may be performed while device 102 is in an idle or sleep state, in some embodiments, sensor rotations may also be performed while device 102 is in use (e.g., by a user) or otherwise active.

As a nonlimiting example, device 102 may be a laptop with sufficient space inside housing 204 to allow sensor system 108 to be rotated. Rotation control logic 116 may cause torque mechanism 110 to rotate sensor system 108 while a user is using device 102. If, for example, a user adjusts a screen of device 102 to achieve a different viewing angle, sensor system 108 may be reoriented as a result into a less optimal orientation, possibly harming performance (e.g., reducing signal strength of an antenna, pointing a camera away from a user's face or target object, etc.). Rotating sensor system 108 back into its previous rotation relative to the environment (or into an even better orientation) may restore previous performance characteristics or even improve upon them. Thus, performance optimization logic 112 may advantageously improve performance (battery life, desired camera orientation, etc.) by performing (e.g., via performance analysis logic 114 and rotation control logic 116) optimization operations while device 102 is in use.

As used in any embodiment herein, the term "logic" may refer to an application, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip, such as an application-specific integrated circuit (ASIC), etc. In some embodiments, the circuitry may be formed, at least in part, by a processor (e.g., processor 104) executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

The foregoing provides example system architectures and methodologies, however, modifications to the present disclosure are possible. For example, the processor may include one or more processor cores and may be configured to execute system software. System software may include, for example, an operating system. Device memory may include I/O memory buffers configured to store one or more data packets that are to be transmitted by, or received by, a network interface.

Memory 106 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800TM-2012: IEEE Standard for SystemVerilog—Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The following examples pertain to further embodiments. The following examples of the present disclosure may comprise subject material such as an apparatus, a method, at least one machine-readable medium for storing instructions that when executed cause a machine to perform acts based on the method, means for performing acts based on the method and/or a system for checkpoint changelog reserved area prediction model training.

According to example 1, there is provided an apparatus having an initial orientation. The apparatus may comprise a sensor system, at least one torque mechanism, and performance optimization logic to determine an optimized orientation of the device, the performance optimization logic including performance analysis logic to determine at least one performance metric of the sensor system, and rotation control logic to cause the at least one torque mechanism to fold the device into a first new orientation other than the initial orientation.

Example 2 may include the elements of example 1, wherein the performance analysis logic is further to compare the at least one performance metric to a first threshold, and responsive to a determination that the at least one performance metric is below the first threshold, send a rotation trigger to the rotation control logic, and the rotation control logic is further to receive the rotation trigger, and the rotation control logic is to cause the at least one torque mechanism to fold the device into a first new orientation other than the initial orientation based, at least in part, on the rotation trigger.

Example 3 may include the elements of example 2, wherein responsive to the device folding into the first new orientation, the performance analysis logic is further to determine at least one first updated performance metric of the sensor system, compare the at least one first updated performance metric to a second threshold, and responsive to a determination that the at least one first updated performance metric is below the second threshold, send a second rotation trigger to the rotation control logic, and the rotation control logic is further to receive the second rotation trigger, and cause the at least one torque mechanism to fold the device into a second new orientation based, at least in part, on the second rotation trigger.

Example 4 may include the elements of example 2 or example 3, wherein the rotation control logic is further to determine a plurality of new orientations, select one of the plurality of new orientations based at least on the rotation trigger, and cause the at least one torque mechanism to fold the device into the selected new orientation.

Example 5 may include the elements of example 4, wherein the rotation control logic is to select the new orientation based, at least in part, on an estimated amount of energy required to cause the at least one torque mechanism to fold the device into the new orientation.

Example 6 may include the elements of any of examples 1-5, further comprising memory circuitry including at least an orientation table to store a plurality of possible orientations of the device, wherein the rotation control logic is to select the new orientation from the possible orientations stored in the orientation table.

Example 7 may include the elements of example 6, wherein the orientation table is further to store performance information corresponding to each of the possible orientations.

Example 8 may include the elements of example 7, wherein the performance optimization logic is to update the orientation table based, at least in part, on the determined sensor performance.

Example 9 may include the elements of any of examples 7-8, wherein the performance information is to indicate a relative performance difference between the corresponding possible orientation and one or more other possible orientations stored in the orientation table.

Example 10 may include the elements of any of examples 6-9, wherein the performance information includes an orientation class of the corresponding possible orientation.

Example 11 may include the elements of example 10, wherein the rotation control logic is to select the new orientation from the orientation table based, at least in part, on the determined sensor performance, the orientation class corresponding to a current orientation, and the orientation class corresponding to the new orientation.

Example 12 may include the elements of any of examples 1-11, wherein the sensor system includes at least a camera to capture an image.

Example 13 may include the elements of example 12, wherein the camera is to capture an image of a user, and the at least one performance metric corresponds to a distance in the image between a recognized face of the user and a center of the image.

Example 14 may include the elements of any of examples 1-11, wherein the sensor system includes at least a radio frequency (RF) transceiver, and the at least one performance metric corresponds to a signal strength of the RF transceiver.

Example 15 may include the elements of any of examples 1-14, wherein the at least one torque mechanism is to apply a torque to at least one component of the device about at least one axis.

According to example 16, there is provided a device orientation optimization method. The method may comprise determining, via performance analysis logic, at least one performance metric of a sensor system, and causing, via rotation control logic, at least one torque mechanism to fold the device into an orientation other than an initial orientation based at least on the at least one performance metric.

Example 17 may include the elements of example 16, further comprising comparing, via the performance analysis logic, the at least one performance metric to a first threshold, sending, by the performance analysis logic responsive to a determination that the at least one performance metric is below the first threshold, a rotation trigger to the rotation control logic, and receiving, at the rotation control logic, the rotation trigger, wherein the causing, via rotation control logic, at least one torque mechanism to fold the device into an orientation other than an initial orientation based at least on the at least one performance metric comprises causing, via rotation control logic, the at least one torque mechanism to fold the device into a first new orientation based at least on the received rotation trigger.

Example 18 may include the elements of example 17, further comprising determining, via the performance analysis logic responsive to the device folding into the first new orientation, at least one first updated performance metric of the sensor system, comparing, via the performance analysis logic, the at least one first updated performance metric to a second threshold, sending, by the performance analysis logic responsive to a determination that the at least one first updated performance metric is below the second threshold, a second rotation trigger to the rotation control logic, receiving, at the rotation control logic, the second rotation trigger, and causing, via the rotation control logic, the at least one torque mechanism to fold the device into a second new orientation based, at least in part, on the second rotation trigger.

Example 19 may include the elements of example 18, further comprising determining, via the rotation control logic, a plurality of new orientations, selecting, by the rotation control logic, one of the plurality of new orientations based at least on the rotation trigger, and causing, by the rotation control logic, the at least one torque mechanism to fold the device into the selected new orientation.

Example 20 may include the elements of example 19, wherein the selecting, by the rotation control logic, one of the plurality of new orientations based at least on the rotation trigger comprises selecting, by the rotation control logic, one of the plurality of new orientations based, at least in part, on an estimated amount of energy required to cause the at least one torque mechanism to fold the device into the new orientation.

Example 21 may include the elements of any of examples 16-20, further comprising storing, via an orientation table, a plurality of possible orientations of the device, wherein the selecting, by the rotation control logic, one of the plurality of new orientations comprises selecting, by the rotation control logic, one of the plurality of possible orientations stored in the orientation table.

Example 22 may include the elements of example 21, further comprising storing, via the orientation table, performance information corresponding to each of the possible orientations.

Example 23 may include the elements of any of examples 21-22, further comprising updating, via performance optimization logic, the observation table based, at least in part, on the determined sensor performance.

Example 24 may include the elements of any of examples 21-23, wherein the performance information is to indicate a relative performance difference between the corresponding possible orientation and one or more other possible orientations stored in the orientation table.

Example 25 may include the elements of any of examples 21-24, wherein the performance information includes an orientation class of the corresponding possible orientation.

Example 26 may include the elements of example 25, wherein the selecting, by the rotation control logic, one of the plurality of possible orientations stored in the orientation table comprises selecting, by the rotation control logic, one of the plurality of possible orientations stored in the orientation table based, at least in part, on the determined sensor performance, the orientation class corresponding to a current orientation, and the orientation class corresponding to the new orientation.

Example 27 may include the elements of any of examples 16-26, wherein the sensor system includes at least a camera to capture an image.

Example 28 may include the elements of example 27, further comprising capturing, by the camera, an image of a user, wherein: the at least one performance metric corresponds to a distance in the image between a recognized face of the user and a center of the image.

Example 29 may include the elements of any of examples 16-26, wherein the sensor system includes at least a radio frequency (RF) transceiver, and the at least one performance metric corresponds to a signal strength of the RF transceiver.

Example 30 may include the elements of any of examples 16-29, further comprising applying, via the at least one torque mechanism, a torque to at least one component of the device about at least one axis.

According to example 31 there is provided a system including at least one device, the system being arranged to perform the method of any of the above examples 16-30.

According to example 32 there is provided a chipset arranged to perform the method of any of the above examples 16-30.

According to example 33 there is provided at least one non-transitory computer readable storage device having stored thereon instructions that, when executed on a computing device, cause the computing device to carry out the method according to any of the above examples 16-30.

According to example 34 there is provided at least one apparatus configured for orientation optimization, the at least one apparatus being arranged to perform the method of any of the above examples 16-30.

According to example 35 there is provided at least one non-transitory computer readable storage device having stored thereon instructions that, when executed on a computing device, cause the computing device to carry out the method according to any of the above examples 16 through 30.

According to example 36 there is provided a system. The system may comprise means for determining at least one performance metric of a sensor system, and means for causing at least one torque mechanism to fold the device into an orientation other than an initial orientation based at least on the at least one performance metric.

Example 37 may include the elements of example 36, further comprising, means for comparing the at least one performance metric to a first threshold, and means for sending, responsive to a determination that the at least one performance metric is below the first threshold, a rotation trigger, wherein the means for causing at least one torque mechanism to fold the device into an orientation other than an initial orientation based at least on the at least one performance metric comprises means for causing the at least one torque mechanism to fold the device into a first new orientation based at least on the received rotation trigger.

Example 38 may include the elements of example 37, further comprising means for determining, responsive to the device folding into the first new orientation, at least one first updated performance metric of the sensor system, means for comparing the at least one first updated performance metric to a second threshold, means for sending, responsive to a determination that the at least one first updated performance metric is below the second threshold, a second rotation trigger, means for receiving the second rotation trigger, and means for causing the at least one torque mechanism to fold the device into a second new orientation based, at least in part, on the second rotation trigger.

Example 39 may include the elements of example 38, further comprising means for determining a plurality of new orientations, means for selecting one of the plurality of new orientations based at least on the rotation trigger, and means for causing the at least one torque mechanism to fold the device into the selected new orientation.

Example 40 may include the elements of example 39, wherein the means for selecting one of the plurality of new orientations based at least on the rotation trigger comprises means for selecting one of the plurality of new orientations based, at least in part, on an estimated amount of energy required to cause the at least one torque mechanism to fold the device into the new orientation.

Example 41 may include the elements of any of examples 36-40, further comprising means for storing a plurality of possible orientations of the device, wherein the selecting, by the rotation control logic, one of the plurality of new orientations comprises selecting, by the rotation control logic, one of the plurality of stored possible orientations.

Example 42 may include the elements of example 41, further comprising means for storing performance information corresponding to each of the stored possible orientations.

Example 43 may include the elements of example 42, further comprising means for updating the stored performance information based, at least in part, on the determined sensor performance.

Example 44 may include the elements of any of examples 42-43, wherein the performance information is to indicate a relative performance difference between the corresponding possible orientation and one or more other stored possible orientations.

Example 45 may include the elements of any of examples 42-44, wherein the performance information includes an orientation class of the corresponding possible orientation.

Example 46 may include the elements of example 45, wherein the means for selecting one of the plurality of stored possible orientations comprises means for selecting one of the plurality of stored possible orientations based, at least in part, on the determined sensor performance, the orientation class corresponding to a current orientation, and the orientation class corresponding to the new orientation.

Example 47 may include the elements of any of examples 36-46, further comprising means for capturing an image of a user, wherein: the at least one performance metric corresponds to a distance in the image between a recognized face of the user and a center of the image.

Example 48 may include the elements of any of examples 36-46, further comprising means for transmitting or receiving radio frequency (RF) transmissions, wherein the at least one performance metric corresponds to a signal strength of RF transmissions.

Example 49 may include the elements of any of examples 36-48, further comprising means for applying a torque to at least one component of a device about at least one axis.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed:

1. A mobile communication device having an initial orientation, comprising:
   a sensor system;
   at least one torque mechanism operable to fold the mobile communication device, wherein to fold the mobile communication device includes to cause a first portion of a housing of the mobile communication device to alter its position with respect to a distinct second portion of the housing; and
   performance optimization logic to determine an optimized orientation of the mobile communication device, the performance optimization logic including:
      performance analysis logic to determine at least one performance metric of the sensor system; and
      rotation control logic to cause the at least one torque mechanism to fold the mobile communication device into an orientation other than the initial orientation.

2. The mobile communication device of claim 1, wherein:
   the performance analysis logic is further to:
      compare the at least one performance metric to a first threshold; and
      responsive to a determination that the at least one performance metric is below the first threshold, send a rotation trigger to the rotation control logic;
   wherein the rotation control logic is further to:
      receive the rotation trigger; and
      cause the at least one torque mechanism to fold the mobile communication device into a first new orientation other than the initial orientation based at least in part on the rotation trigger.

3. The mobile communication device of claim 2, wherein:
   responsive to the mobile communication device folding into the first new orientation, the performance analysis logic is further to:
      determine at least one first updated performance metric of the sensor system;
      compare the at least one first updated performance metric to a second threshold; and
      responsive to a determination that the at least one first updated performance metric is below the second threshold, send a second rotation trigger to the rotation control logic;
   wherein the rotation control logic is further to:
      receive the second rotation trigger; and
      cause the at least one torque mechanism to fold the mobile communication device into a second new orientation based at least in part on the second rotation trigger.

4. The mobile communication device of claim 2, wherein the rotation control logic is further to:
   determine a plurality of new orientations; and
   select one of the plurality of new orientations based at least on the rotation trigger; and
   cause the at least one torque mechanism to fold the mobile communication device into the selected new orientation.

5. The mobile communication device of claim 4, wherein the rotation control logic is to select the new orientation based at least in part on an estimated amount of energy required to cause the at least one torque mechanism to fold the mobile communication device into the new orientation.

6. The mobile communication device of claim 1, wherein the mobile communication device includes a plurality of sensor systems, wherein the first portion of the housing houses a first sensor system of the plurality of sensor systems, and wherein the distinct second portion of the housing houses a second sensor system of the plurality of sensor systems.

7. The mobile communication device of claim 1, wherein:
   the sensor system includes a camera to capture an image of a user; and
   the at least one performance metric corresponds to a distance in the image between a recognized face of the user and a center of the image.

8. The mobile communication device of claim 1, wherein:
   the sensor system includes a radio frequency (RF) transceiver; and
   the at least one performance metric corresponds to a signal strength of the RF transceiver.

9. The mobile communication device of claim 1, wherein the at least one torque mechanism is to apply a torque to at least one component of the mobile communication device about at least one axis.

10. A method of optimizing orientation of a mobile communication device, comprising:
    determining, via performance analysis logic, at least one performance metric of a sensor system of the mobile communication device; and
    causing, via rotation control logic, at least one torque mechanism to fold the mobile communication device into an orientation other than an initial orientation based at least on the at least one performance metric, wherein causing the at least one torque mechanism to fold the mobile communication device includes causing a first portion of a housing of the mobile communication device to alter its position with respect to a distinct second portion of the housing of the mobile communication device via the at least one torque mechanism.

11. The method of claim 10, further comprising:
    comparing, via the performance analysis logic, the at least one performance metric to a first threshold;
    sending, by the performance analysis logic and responsive to determining that the at least one performance metric is below the first threshold, a rotation trigger to the rotation control logic; and
    receiving, at the rotation control logic, the rotation trigger; and
    wherein causing the at least one torque mechanism to fold the mobile communication device into an orientation other than the initial orientation comprises causing the at least one torque mechanism to fold the mobile communication device into a first new orientation based at least on the received rotation trigger.

12. The method of claim 11, further comprising:
    determining, via the performance analysis logic and responsive to the mobile communication device being folded into the first new orientation, at least one first updated performance metric of the sensor system;
    comparing, via the performance analysis logic, the at least one first updated performance metric to a second threshold;
    sending, by the performance analysis logic and responsive to a determination that the at least one first updated performance metric is below the second threshold, a second rotation trigger to the rotation control logic;
    receiving, at the rotation control logic, the second rotation trigger; and
    causing, via the rotation control logic, the at least one torque mechanism to fold the mobile communication device into a second new orientation based at least in part on the second rotation trigger.

13. The method of claim 12, further comprising:
determining, via the rotation control logic, a plurality of new orientations;
selecting, by the rotation control logic, one new orientation of the plurality of new orientations based at least on the rotation trigger; and
causing, by the rotation control logic, the at least one torque mechanism to fold the mobile communication device into the selected one new orientation.

14. The method of claim 13, wherein the selecting of the one new orientation comprises selecting the one new orientation based at least in part on an estimated amount of energy required to cause the at least one torque mechanism to fold the mobile communication device into the one new orientation.

15. The method of claim 10, wherein the mobile communication device includes a plurality of sensor systems, wherein the first portion of the housing houses a first sensor system of the plurality of sensor systems, and wherein the distinct second portion of the housing houses a second sensor system of the plurality of sensor systems.

16. The method of claim 10, further comprising capturing an image of a user by a camera of the mobile communication device, wherein the at least one performance metric corresponds to a distance in the image between a recognized face of the user and a center of the image.

17. The method of claim 10, wherein:
the sensor system includes a radio frequency (RF) transceiver; and
the at least one performance metric corresponds to a signal strength of the RF transceiver.

18. At least one non-transitory computer-readable storage medium having instructions stored thereon which, when executed by at least one processor of a mobile communication device, result in operations comprising to:
determine, via performance analysis logic, at least one performance metric of a sensor system of the mobile communication device; and
cause, via rotation control logic, at least one torque mechanism to fold the mobile communication device into an orientation other than an initial orientation based at least on the at least one performance metric, wherein to cause the at least one torque mechanism to fold the mobile communication device includes to cause a first portion of a housing of the mobile communication device to alter its position with respect to a distinct second portion of the housing of the mobile communication device via the at least one torque mechanism.

19. The at least one non-transitory computer-readable storage medium of claim 18, wherein the instructions, when executed by the at least one processor, result in further operations comprising to:
compare, via the performance analysis logic, the at least one performance metric to a first threshold;
send, by the performance analysis logic and responsive to a determination that the at least one performance metric is below the first threshold, a rotation trigger to the rotation control logic; and
receive, at the rotation control logic, the rotation trigger;
wherein to cause the at least one torque mechanism to fold the device into an orientation other than the initial orientation includes to cause, via the rotation control logic, the at least one torque mechanism to fold the mobile communication device into a first new orientation based at least on the received rotation trigger.

20. The at least one non-transitory computer-readable storage medium of claim 19, wherein the instructions, when executed by the at least one processor, result in further operations comprising to:
determine, via the performance analysis logic and responsive to the mobile communication device being folded into the first new orientation, at least one first updated performance metric of the sensor system;
compare, via the performance analysis logic, the at least one first updated performance metric to a second threshold;
send, by the performance analysis logic and responsive to a determination that the at least one first updated performance metric is below the second threshold, a second rotation trigger to the rotation control logic;
receive, at the rotation control logic, the second rotation trigger; and
cause, via the rotation control logic, the at least one torque mechanism to fold the mobile communication device into a second new orientation based at least in part on the second rotation trigger.

21. The at least one non-transitory computer-readable storage medium of claim 20, wherein the instructions, when executed by the at least one processor, result in further operations comprising:
determine, via the rotation control logic, a plurality of new orientations;
select, by the rotation control logic, one new orientation of the plurality of new orientations based at least on the rotation trigger; and
cause, by the rotation control logic, the at least one torque mechanism to fold the mobile communication device into the selected one new orientation.

22. The at least one non-transitory computer-readable storage medium of claim 21, wherein to select the one new orientation includes to select the one new orientation based at least in part on an estimated amount of energy required to cause the at least one torque mechanism to fold the device into the one new orientation.

23. The at least one non-transitory computer-readable storage medium of claim 18, wherein the mobile communication device includes a plurality of sensor systems, wherein the first portion of the housing houses a first sensor system of the plurality of sensor systems, and wherein the distinct second portion of the housing houses a second sensor system of the plurality of sensor systems.

24. The at least one non-transitory computer-readable storage medium of claim 18, wherein the mobile communication device includes a camera to capture an image of a user, and wherein the at least one performance metric corresponds to a distance in the image between a recognized face of the user and a center of the image.

25. The at least one non-transitory computer-readable storage medium of claim 18, wherein:
the sensor system includes a radio frequency (RF) transceiver; and
the at least one performance metric corresponds to a signal strength of the RF transceiver.

* * * * *